US008046690B2

(12) United States Patent
Cho et al.

(10) Patent No.: US 8,046,690 B2
(45) Date of Patent: Oct. 25, 2011

(54) DISPLAY APPARATUS AND CONTROL METHOD THEREOF

(75) Inventors: Seung-kee Cho, Anyang-si (KR); Seung-yeob Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 754 days.

(21) Appl. No.: 12/117,763

(22) Filed: May 9, 2008

(65) Prior Publication Data

US 2009/0063982 A1 Mar. 5, 2009

(30) Foreign Application Priority Data

Aug. 29, 2007 (KR) ........................ 10-2007-0087051

(51) Int. Cl.
*G06F 3/00* (2006.01)
(52) U.S. Cl. ...................... 715/730; 715/731; 715/732
(58) Field of Classification Search .......... 715/730–732, 715/704, 723–726; 345/475
See application file for complete search history.

(56) References Cited

U.S. PATENT DOCUMENTS

| | | | |
|---|---|---|---|
| 2002/0054116 A1* | 5/2002 | Pavley et al. .................. 345/765 |
| 2002/0075269 A1* | 6/2002 | Dutta et al. ................... 345/473 |
| 2003/0063096 A1* | 4/2003 | Burke ............................ 345/582 |
| 2004/0114904 A1* | 6/2004 | Sun et al. ........................ 386/46 |
| 2005/0034077 A1* | 2/2005 | Jaeger ............................ 715/732 |
| 2005/0060570 A1* | 3/2005 | Ueda .............................. 713/200 |
| 2005/0104886 A1* | 5/2005 | Rao ................................ 345/473 |
| 2005/0107073 A1 | 5/2005 | Cheiky et al. |
| 2005/0228897 A1* | 10/2005 | Yamamoto et al. ........... 709/231 |
| 2006/0174291 A1* | 8/2006 | Takai et al. ...................... 725/88 |
| 2006/0188237 A1* | 8/2006 | Watanabe et al. ............. 386/117 |
| 2006/0234765 A1* | 10/2006 | Herberger et al. .......... 455/552.1 |
| 2006/0268121 A1* | 11/2006 | Watanabe .................. 348/231.2 |
| 2007/0078993 A1* | 4/2007 | Issa ............................... 709/229 |
| 2007/0182822 A1* | 8/2007 | Hale et al. ................ 348/207.99 |
| 2008/0195997 A1* | 8/2008 | Herberger et al. ............. 717/100 |

FOREIGN PATENT DOCUMENTS

EP 1 431 887 A2 6/2004

OTHER PUBLICATIONS

Sony Ericsson Mobile Communications AB, "Sony Ericsson MMV-200", Retrieved from Internet on Apr. 3, 2007, URL http://www.sonyericsson.com/downloads/MMV200_UG_R2a_Multilingual1.pdf.

* cited by examiner

*Primary Examiner* — Tadeese Hailu
(74) *Attorney, Agent, or Firm* — Sughrue Mion, PLLC (57) ABSTRACT

A display apparatus which has a display unit includes: a communication unit which communicates with an external source supplying a image signal including a plurality of still images; an image processor which processes the image signal; and a controller which controls the image processor to perform a slide show function sequentially displaying the supplied still images on the display unit in every predetermined display cycle if the still images are supplied from the external source.

19 Claims, 6 Drawing Sheets

WILL YOU END SLIDE SHOW?

⊙ YES

○ NO

○ SETTING TIME

FIG. 4

| CONTENT LIST |
|---|
| 1. XXXXX.JPG |
| 2. XXXXX.AVI |
| 3. XXXXX.MP3 |
| 4. XXXXX.BMP |
| 5. AAAAA.JPG |
| 6. AAAAA.WAV |
| 7. AAAAA.MP2 |
| 8. AAAAA.GIF |
| ⋮ |

DISPLAY APPARATUS AND CONTROL METHOD THEREOF

CROSS-REFERENCE TO RELATED APPLICATION

This application claims priority from Korean Patent Application No. 10-2007-0087051, filed on Aug. 29, 2007 in the Korean Intellectual Property Office, the disclosure of which is incorporated herein by reference.

BACKGROUND OF THE INVENTION

1. Field of the Invention

Apparatuses and methods consistent with the present invention relate to a display apparatus and a control method thereof, and more particularly to a display apparatus which receives a still image from an external source, and a control method thereof.

2. Description of the Related Art

With the development of wireless communication protocols such as Bluetooth, communication between mobile terminals is actively encouraged. Thus, a user terminal may transmit various contents such as audio and video clips and images to other terminals, and may play the transmitted content without difficulty.

Among profiles of Bluetooth, Basic Imaging Profile (BIP) supports reception of images from an external device or transmission of images to an external device. File Transfer Profile (FTP) supports reception and transmission video and audio files as well as images.

However, the BIP and FTP only support transmission of contents, and do not supporting playing transmitted content automatically. The transmitted contents are stored in an embedded memory of the terminal or in an external memory, and then played through an additional play process.

SUMMARY OF THE INVENTION

The present invention provides a display apparatus which easily performs a slide show function for a still image among contents input from the outside, and a control method thereof.

The present invention also provides a display apparatus which displays user interface (UI) information to control a slide show function, and a control method thereof.

According to an aspect of the present invention, there is provided a display apparatus comprising: a display unit; a communication unit which communicates with an external source supplying a content including a still image; an image processor which processes an image signal; and a controller which controls the image processor to perform a slide show function sequentially displaying the supplied still image on the display unit in every predetermined display cycle if the still image is supplied from the external source.

The display apparatus may further comprise a user selection unit to select the slide show function.

The display apparatus may further comprise a UI generator to generate UI information, wherein the controller controls the UI generator to display a content list including content items on the display unit if the slide show function is selected.

The controller may control the communication unit and the image processor to sequentially display only items corresponding to still images among the selected content items on the display unit if at least one of the content items is selected through the user selection unit.

The controller may control the UI generator to display a slide show-ending window on the display unit and select an end of the slide show while the slide show function is performed.

The predetermined display cycle may correspond to a sum of time for transmitting the still image through the communication unit and time for processing the still image by the image processor.

The display apparatus may further comprise a user selection unit to adjust the predetermined display cycle, wherein the controller controls the image processor to display the still image on the display unit according to the adjusted display cycle.

The adjusted display cycle may be longer than a sum of time for transmitting the still image through the communication unit and time for processing the still image by the image processor.

The communication unit may comprise at least one of a Bluetooth communication unit, an infrared communication unit and a Wireless Internet Platform for Interoperability (WIPI) communication unit.

According to another aspect of the present invention, there is provided a display apparatus comprising: a display unit; a communication unit which communicates with an external source supplying a content including a still image; an image processor which processes an image signal; a user selection unit which is provided to select a slide show function displaying the still image on the display unit in every predetermined display cycle; and a controller which continuously receives the still image from the external source and controls the communication unit and the image processor to sequentially display the received still image on the display unit, if the slide show function is selected.

According to another aspect of the present invention, there is provided a control method of a display apparatus which communicates with an external source supplying a content including a still image, the control method comprising: receiving a selection signal to select a slide show function sequentially displaying a plurality of still images in every predetermined display cycle; receiving the still images from the external source; and sequentially displaying the received still images in predetermined every display cycle.

The control method may further comprise receiving a content list including content items which can be supplied from the external source, wherein the receiving the still images comprises receiving a content item corresponding to still images from the content list.

A subsequent still image may be transmitted while a single still image is displayed.

The control method may further comprise displaying a content list including content items which can be supplied from the external source.

The control method may further comprise receiving a signal to select still images among items from the content list, wherein the receiving the still images comprises sequentially receiving the selected still images.

The control method may further comprise displaying a slide show-ending window to select an end of the slide show.

BRIEF DESCRIPTION OF THE DRAWINGS

The above and/or other aspects of the present invention will become apparent and more readily appreciated from the following description of exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
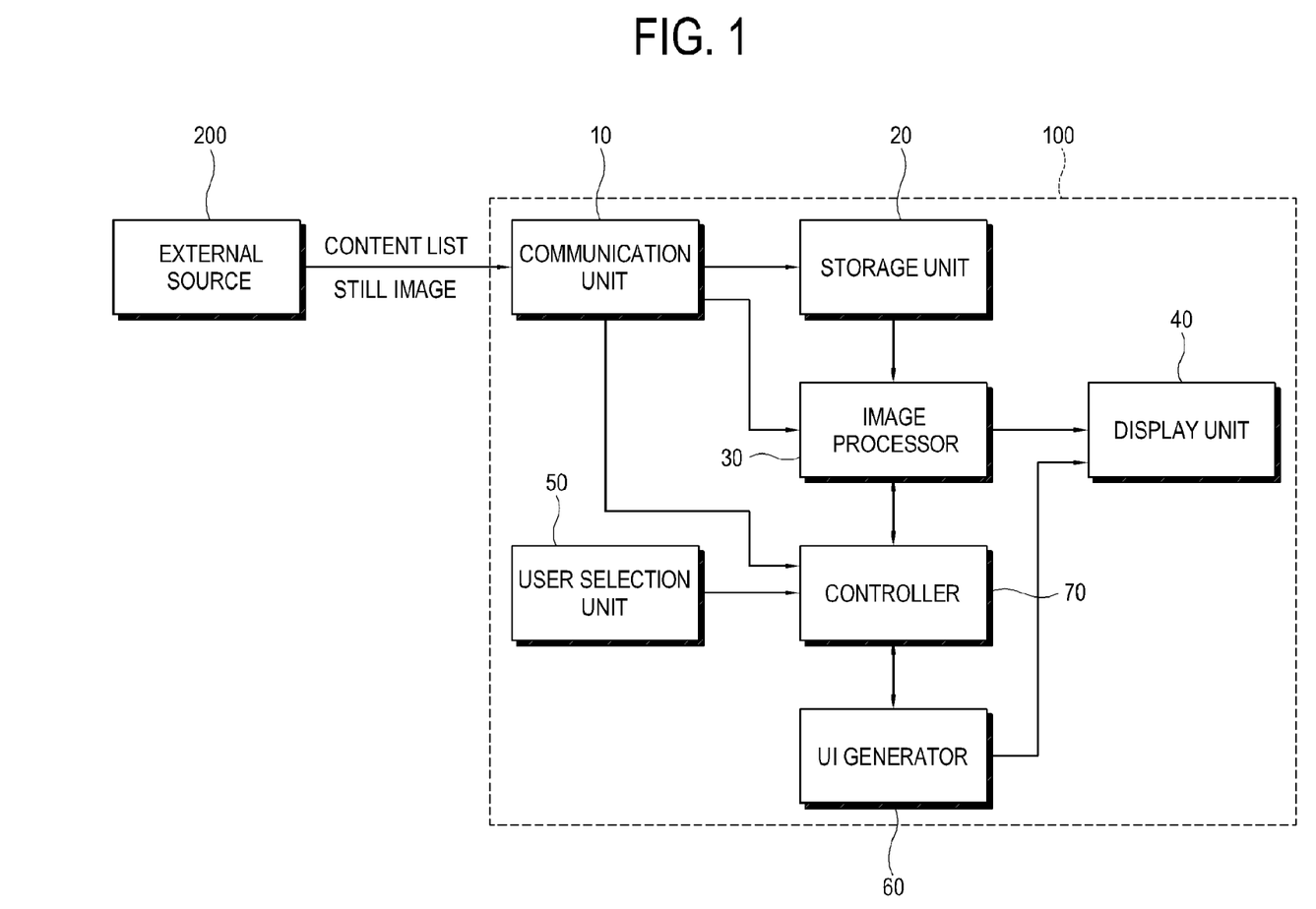
FIG. 1 is a control block diagram of a display apparatus according to a first exemplary embodiment of the present invention.

FIG. 1 is a control block diagram of a display apparatus according to a first exemplary embodiment of the present invention.

As shown therein, a display apparatus 100 includes a communication unit 10, a storage unit 20, an image processor 30, a display unit 40, a user selection unit 50, a UI generator 60 and a controller 70. The display apparatus 100 may include a mobile terminal like a mobile phone, a (PDA) personal digital assistant and a laptop computer which communicates with an external source 200 through the communication unit 10, or a display unit of a television (TV), a desktop computer and various electronic goods supporting wireless communication.

The external source 200 provides the display apparatus 100 with contents such as still images, video and audio files. The external source 200 may vary like the display apparatus 100. The external source 200 includes a communication unit (not shown) which communicates with the communication unit 10 of the display apparatus 100 and transmits content. Although a single external source 200 which supplies contents is shown in FIG. 1, a plurality of external source which supply contents may be provided. A control signal may be input from the communication unit 10 of the display apparatus 100 to the external source 200 to request contents. The external source 200 may transmit a list of contents which can be supplied to the display apparatus 100.

The communication unit 10 communicates with the external source 200 according to a control of the controller 70, and receives contents including still images from the external source 200. After starting communication with the external source 200, the communication unit 10 receives the content list including content items to be supplied from the external source 200. The content list includes a file extension to identify the types of the contents. The contents may include moving images, still images or audio files. The content list may include identification information about the external source 200. As described above, if the plurality of external sources supplies contents, a user may easily recognize which content is supplied from which external source, through the identification information. In this case, even if the contents having the same file name are supplied, a user may recognize the source of the contents. The controller 70 may receive particular contents only from the external sources by referring to the content list.

The communication unit 10 may include at least one of a Bluetooth communication unit, an infrared communication unit and a WIPI communication unit. For example, the Bluetooth includes a BIP which supports receiving and transmitting picture files from the outside, and an FTP which additionally supports receiving and transmitting video and audio files other than the picture files. The communication unit 10 includes a signal transmission and reception unit to communicate with the external source 200, and all hardware and software operating according to particular communication standards. The communication unit 10 according to the present invention is not limited to those above, and includes other known communication standards to receive a still image.

It takes approximately one to three seconds to transmit a single still image from the external source 200 to the communication unit 10 even though it slightly differs depending on communication environment and communication standards. The storage unit 20 stores therein still images or moving images supplied from the communication unit 10. The communication unit 20 may include a volatile memory to temporarily store an image signal, an electrically erasable programmable read only memory (EEPROM) or a flash memory to permanently store an image signal. The storage unit 20 may include a memory which is embedded in the display apparatus 100 or an external memory, e.g., an external hard disk drive (HDD) or a universal serial bus (USB) storage which is detachably attached to the display apparatus 100. The image signal stored in the storage unit 20 may be processed by the image processor 30 to be played according to a user's selection. The received contents may be separately stored corresponding to each of the external source 200.

The image processor 30 processes the still image or moving image supplied to the communication unit 10 or stored in the storage unit 20 to be displayed on the display unit 40. The image processor 30 may include a decoder (not shown) which decodes a compressed image signal, a scaler (not shown) which scales the image signal according to a format supported by the display unit 40, etc.

The display unit 40 displays the image signal processed by the image processor 30 and UI information generated by the UI generator 60. The display unit 40 may include a liquid crystal display (LCD) panel, an organic light emitting diode (OLED) panel or a plasma display panel (PDP).

The user selection unit 50 generates a selection signal to select a slide show function and outputs various control signals according to user's manipulation. The slide show function sequentially displays still images on the display unit 40 in every predetermined display cycle. The user selection unit 50 may include an additional hot key or a touch pad to select the slide show function or a remote controller remotely communicating with the display apparatus 100. The hot key or the touch pad may be provided in an external frame of the display apparatus 100. The touch pad may include a touch panel of the display unit 40. The user selection unit 50 may include a general input unit such as a keyboard or a mouse.

Figure 3:
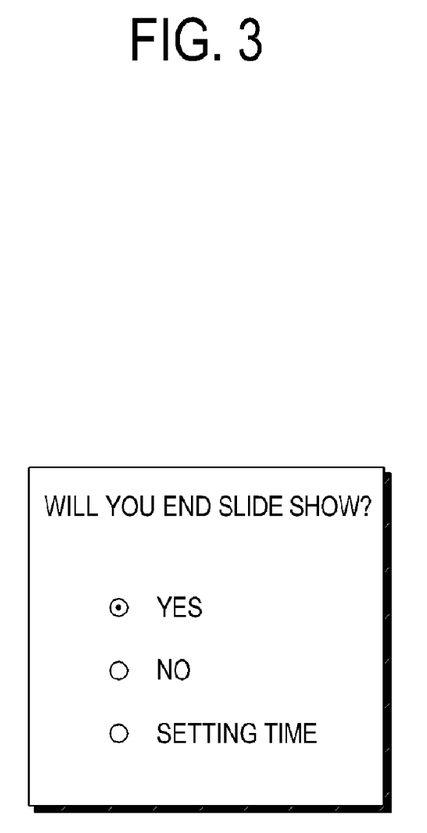
FIG. 3 illustrates a slide show-ending window according to the first exemplary embodiment of the present invention.

The UI generator 60 generates various types of UI information to control the slide show function according to a control of the controller 70, and displays the UI information on the display unit 40. The UI information includes a slide show-ending window I as shown in FIG. 3.

Figure 2:
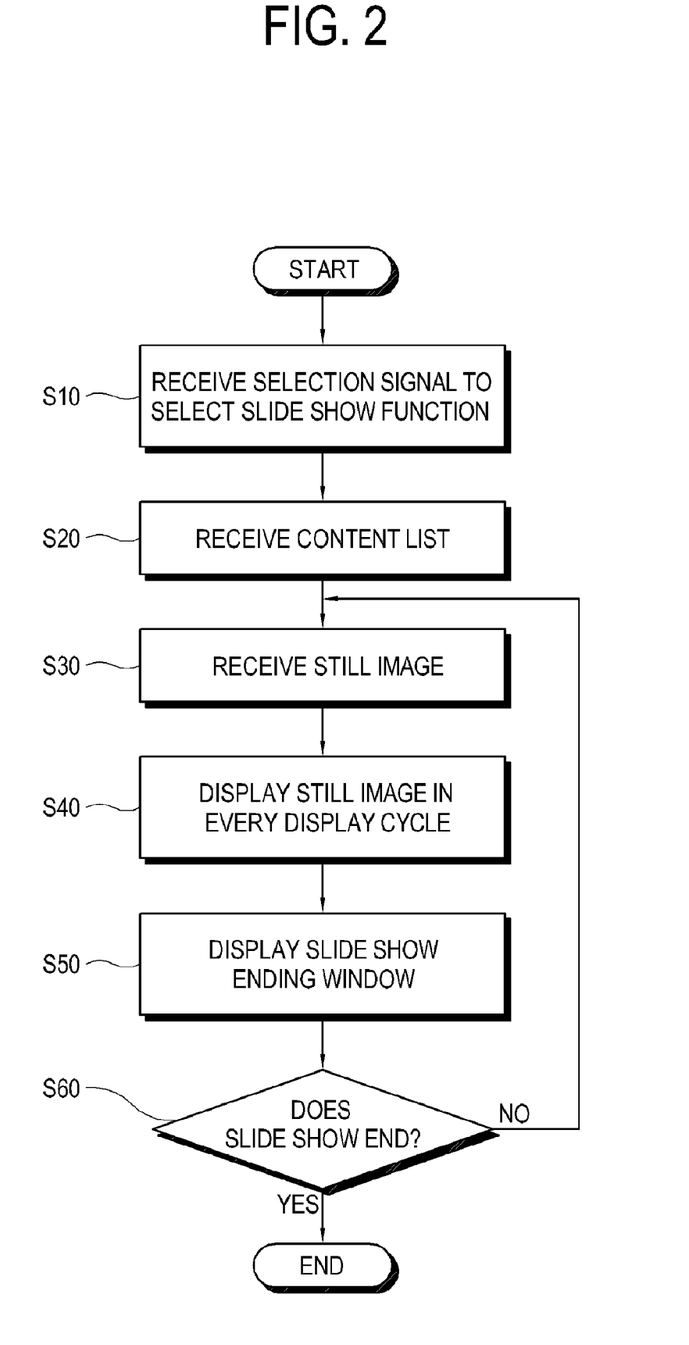
FIG. 2 a control flowchart to describe a control method of the display apparatus according to the first exemplary embodiment of the present invention.

The controller 70 controls the communication unit 10 to receive only still images from the external source 200, and controls the image processor 30 to perform the slide show function which sequentially displays the supplied still images on the display unit 40 in every predetermined display cycle. In a conventional display apparatus, as the image signal supplied from the external source is not played immediately, a user had to play the image signal through an additional play process. On the other hand, the display apparatus 100 according to the present exemplary embodiment controls the communication unit 10 and the image processor 30 to perform the slide show function if a user selects the slide show function through the user selection unit 50 to sequentially play the still images. That is, a user may sequentially view the still images through a single manipulation. FIG. 2 is a control flowchart to describe a control method of the display apparatus 100 according to the present exemplary embodiment. Hereinafter, the control method of the controller 70 will be described with reference to FIG. 2.

The controller 70 receives the selection signal to select the slide show function (S10). If the slide show function is selected, the controller 70 requests the information about the content items which may be supplied from the external source 200 through the communication unit 10, and receives the content list (S20). The controller 70 then checks the file extension of the contents from the content list and sequentially receives only the content items corresponding to the still images (S30). The file extension of the still images includes jpg, jpeg, bmp, gif, etc. The controller 70 sequentially checks the content items of the content list and receives only the content items having the file extension corresponding to the still images from the external source 200.

The controller 70 controls the image processor 30 to sequentially display the supplied still images on the display unit 40 in every display cycle (S40). As described above, it takes some time to transmit the contents from the external source 200 to the display apparatus 100. A still image takes approximately one to three seconds to be transmitted. The controller 70 continuously receives the still images, and at the same time displays the previously-received still images on the display unit 40 while a subsequent still image is received. In other words, a current still image is transmitted to the display apparatus 100 while a previous still image is displayed. Thus, a user may recognize that the still images are played like a slide show. The display cycle according to the present exemplary embodiment corresponds to the sum of time for transmitting the still image through the communication unit 10 and time for processing the still image by the image processor 30.

While the slide show function is performed, the controller 70 controls the UI generator 60 to display the slide show-ending window I on the display unit 40 so that a user can select an end of the slide show (S50). FIG. 3 illustrates the slide show-ending window. The slide show-ending window includes a message to confirm the end of the slide show, "yes", "no" and "setting time" items. If a user selects "yes", the slide show ends. If a user selects "no", the slide show is continued (S60). If a user selects "setting time", a sub window (not shown) is displayed to set slide show-displaying time. Thus, a user may set desired time for displaying the slide show. The slide show-ending window I may be displayed at constant time intervals while the slide show is performed or may be displayed whenever a certain number of still images is displayed. If the selection signal is generated by the user selection unit 50 to end the slide show function, the slide show-ending window I may be displayed.

Figure 4:
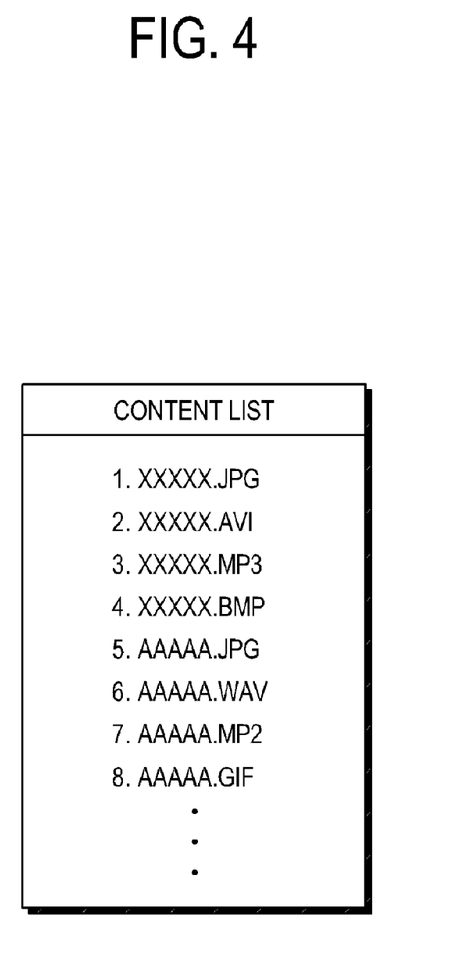
FIG. 4 illustrates a content list according to a second exemplary embodiment of the present invention.

FIG. 4 illustrates a content list according to a second exemplary embodiment of the present invention.

As described above, external source(s) 200 transmits various contents to a display apparatus 100, and transmits a content list including content items through a communication unit 10. A controller 70 displays a content list supplied from the communication unit 10, on a display unit 40. A user may recognize which content can be transmitted, through the content list, and may play moving image, still images or audio files according to his/her preferences. Also, a user may perform the slide show by selecting only still images from the content list. As shown therein, the content list shows file extension of moving image such as avi, mp2, file extension of audio files such as mp3, wav, and file extension of still images such as jpg, bmp and gif. If the contents are received from a plurality of external sources, the content list may be generated for each external source to be display on the display unit 40, or a single content list may include all contents.

Figure 5:
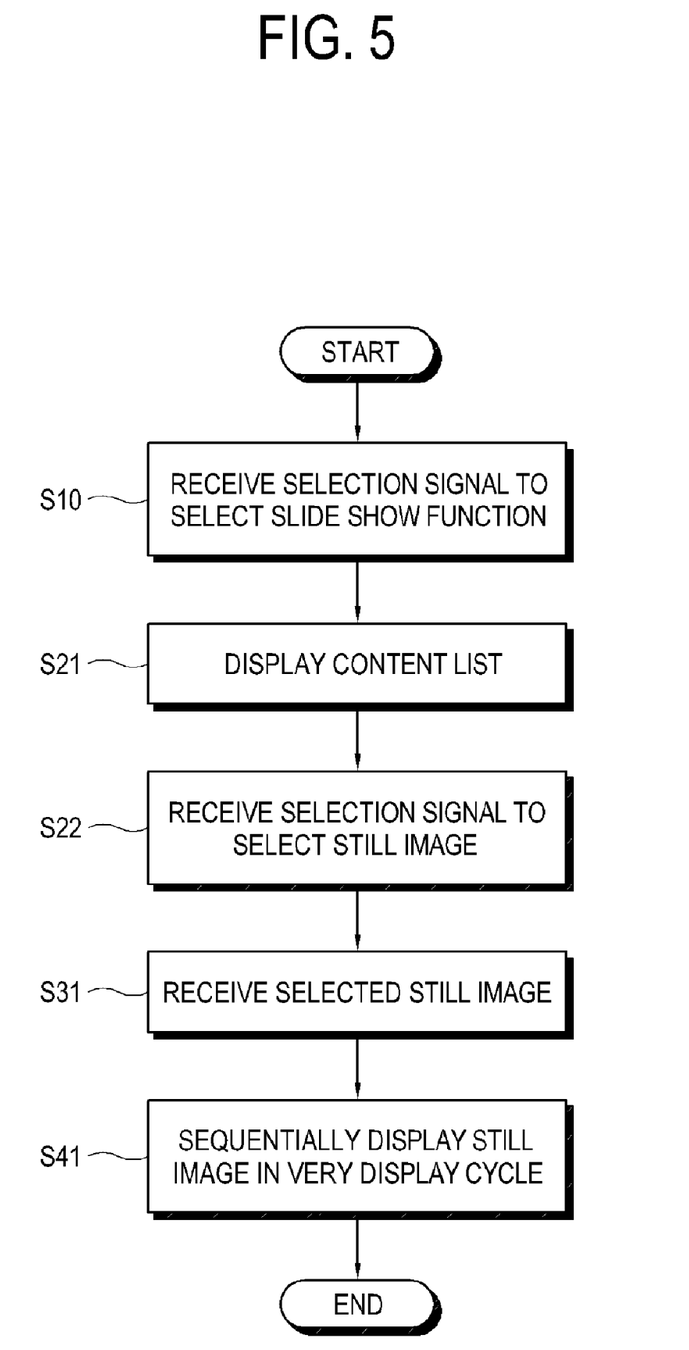
FIG. 5 is a control flowchart to describe a control method of a display apparatus according to the second exemplary embodiment of the present invention.

FIG. 5 is a control flowchart to describe a control method of the display apparatus 100 according to the present exemplary embodiment. The controller 70 receives a selection signal to select the slide show function (S10), and requests information about the content items which can be supplied through the communication unit 10, to the external source(s) 200. Then, the controller 70 displays the received content list II on the display unit 40 (S21).

A user may select the still image to be displayed as the slide show, through the user selection unit 50. The controller 70 receives the selection signal to select the still image (S22), and receives the selected still image from the external source 200 (S31). The controller 70 determines whether the selected content items correspond to the still image, and receives the contents from the external source 200 only when the content items correspond to the still images. That is, even if a user selects the moving image or audio files after selecting the slide show function, the controller 70 does not receive the moving image or audio files. Instead, the controller 70 receives only the still images not to affect the slide show function. A user may select all still images or the limited number of still images.

Then, the controller 70 controls the image processor 50 to sequentially display the still images in every display cycle (S41).

According to another exemplary embodiment, the display apparatus 100 may automatically receive the content list after starting communication with the external source 200, and display the content list on the display unit 40. A user may select the slide show function after checking the content list. If a user desires to play the still image from the content list, the slide show automatically may be performed.

Figure 6:
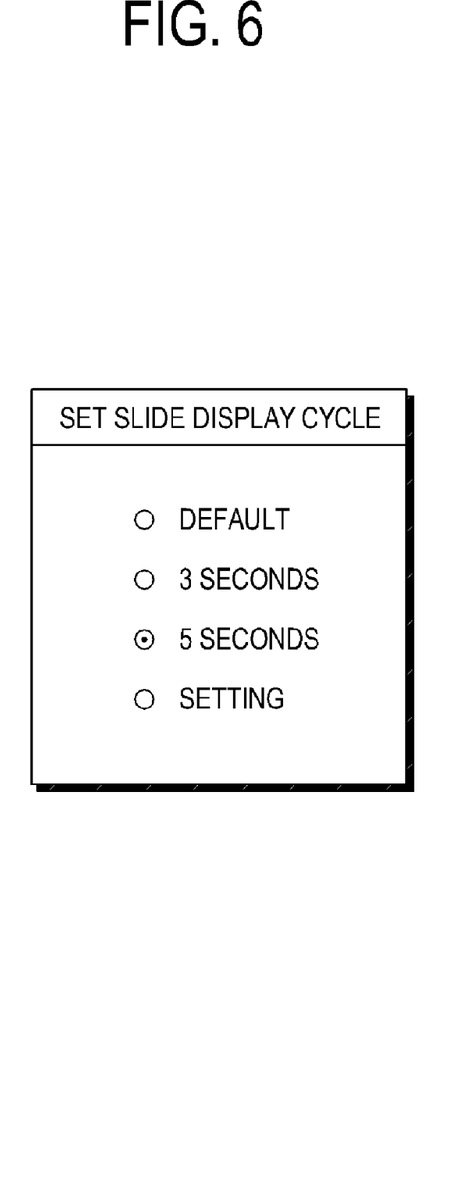
FIG. 6 illustrates a setting window of a slide display cycle of a display apparatus according to a third exemplary embodiment of the present invention.

FIG. 6 illustrates a setting window of the slide show display cycle for a display apparatus according to a third exemplary embodiment of the present invention. As described above, it takes some time to transmit the still image from the external source 200. According to the first exemplary embodiment, the display cycle corresponds to the sum of time for transmitting the still image and time for processing the still image.

According to the present exemplary embodiment, a user may set or adjust the pace of the slide show, i.e. the display cycle of the still image, through a user selection unit 50. If a control signal is input through the user selection unit 50 to adjust the display cycle, a controller 70 controls a UI generator 60 to display a setting window of a slide display cycle in FIG. 6. The setting window of the slide display cycle includes "default", "three seconds" "five seconds" and "setting" items. A user may select time among the items. Also, a user may adjust the default time. Preferably, but not necessarily, the display cycle adjusted by a user is longer than the sum of time for transmitting the still image through the communication unit 10 and time for processing the still image by the image processor 30. If the display cycle is shorter than time for transmitting and processing the still image, the still image is not displayed normally and the slide show function is not performed properly.

The present invention allows a user to view a slide show of still images by using time taken for transmitting still images to the display apparatus 100 from the external source 200.

As described above, the present invention provides a display apparatus which easily performs a slide show function for still images input from the outside, and a control method thereof.

Also, the present invention provides a display apparatus which displays UI information to control a slide show function, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a display unit;
a communication unit which communicates with an external source which supplies an image signal including a plurality of still images;
an image processor which processes the image signal including the still images; and
a controller which controls the image processor to perform a slide show function that sequentially displays the still images on the display unit in every predetermined display cycle, by displaying each received still image while a subsequent one of the still images is transmitted from the external source to the communication unit.

2. The display apparatus according to claim 1, further comprising a user selection unit through which the slide show function is selectable.

3. The display apparatus according to claim 2, further comprising a user interface (UI) generator which generates UI information,
wherein the controller controls the UI generator to display on the display unit a content list including content items which can be supplied by the external source if the slide show function is selected.

4. The display apparatus according to claim 3, wherein the controller controls the communication unit and the image processor to sequentially display only items corresponding to still images among the selected content items on the display unit if at least one of the content items is selected through the user selection unit.

5. The display apparatus according to claim 3, wherein the controller controls the UI generator to display on the display unit a slide show-ending window to select an end of the slide show while the slide show function is performed.

6. The display apparatus according to claim 1, wherein the predetermined display cycle corresponds to a sum of a time for transmitting a still image through the communication unit and a time for processing the still image by the image processor.

7. The display apparatus according to claim 1, further comprising a user selection unit through which the predetermined display cycle is adjustable,
wherein the controller controls the image processor to display the still images on the display unit according to an adjusted display cycle.

8. The display apparatus according to claim 1, wherein the communication unit comprises at least one of a Bluetooth communication unit, an infrared communication unit and a Wireless Internet Platform for Interoperability communication unit.

9. The display apparatus according to claim 1, wherein, upon receiving a slide show selection command for selecting the slide show function, the controller automatically requests a content list of a plurality of content stored on the external source from the external source, automatically receives the content list from the external source, automatically identifies the plurality of still images on the content list from among the plurality of content, and automatically controls the communication unit to receive only the plurality of still images among the plurality of content from the external source.

10. The display apparatus according to claim 9, wherein the controller automatically selects the plurality of still images to be received from among the plurality of content based on the content list, and automatically controls the communication unit to extract the plurality of still images identified in the content list from the external source without user selection of the plurality of still images.

11. The display apparatus according to claim 9, wherein the plurality of content comprises the plurality of still images, audio files and moving image files.

12. A display apparatus comprising:
a display unit;
a communication unit which communicates with an external source which supplies an image signal including a plurality of still images;
an image processor which processes the image signal including the plurality of still images;
a controller which controls the image processor to perform a slide show function sequentially displaying the plurality of still images on the display unit in every predetermined display cycle; and
a user selection unit through which the predetermined display cycle is adjustable,
wherein the controller controls the image processor to display the plurality of still images on the display unit according to an adjusted display cycle, and
wherein the adjusted display cycle is longer than a sum of a time for transmitting a still image through the communication unit and a time for processing the still image by the image processor.

13. A display apparatus comprising:
a display unit;
a communication unit which communicates with an external source supplying an image signal including a plurality of still images;
an image processor which processes the image signal including the still images;
a user selection unit through which a slide show function for displaying the still images on the display unit in every predetermined display cycle is selectable; and
a controller which continuously receives the still images from the external source and controls the communication unit and the image processor to sequentially display the received still images on the display unit, if the slide show function is selected,
wherein the controller controls the image processor to perform the slide show function that sequentially displays the still images on the display unit in every predetermined display cycle, by displaying each received still image while a subsequent one of the still images is transmitted from the external source to the communication unit.

14. A control method of a display apparatus which communicates with an external source supplying a plurality of still images, the control method comprising:

receiving a selection signal to select a slide show function for sequentially displaying the still images in every predetermined display cycle;

receiving the still images from the external source; and sequentially displaying the still images in predetermined every display cycle, wherein the sequentially displaying the still images comprises performing the slide show function that sequentially displays the still images on a display unit in every predetermined display cycle, by displaying each received still image while a subsequent one of the still images is transmitted from the external source to the display apparatus.

15. The control method according to claim 14, further comprising receiving a content list including content items which can be supplied from the external source, wherein the receiving the still images comprises receiving a content item corresponding to the still images from the content list.

16. The control method according to claim 15, wherein a subsequent still image is transmitted while a single still image is displayed.

17. The control method according to claim 14, further comprising displaying a content list including content items which can be supplied from the external source.

18. The control method according to claim 17, further comprising receiving a signal to select still images among items from the content list, wherein the receiving the still images comprises sequentially receiving the selected still images.

19. The control method according to claim 14, further comprising displaying a slide show-ending window for selecting an end of the slide show.

\* \* \* \* \*